F. MUMMELTHEY.
NUT LOCK.
APPLICATION FILED JAN. 22, 1912.
1,046,483.
Patented Dec. 10, 1912.
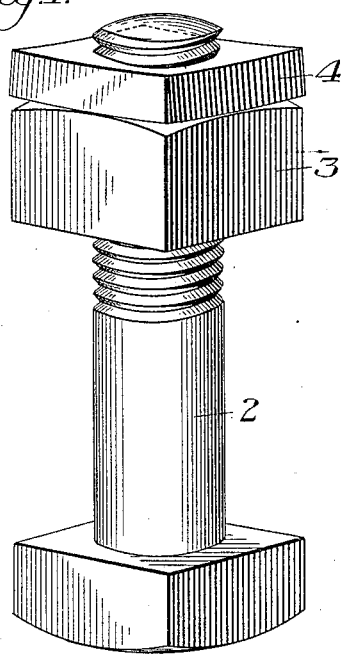
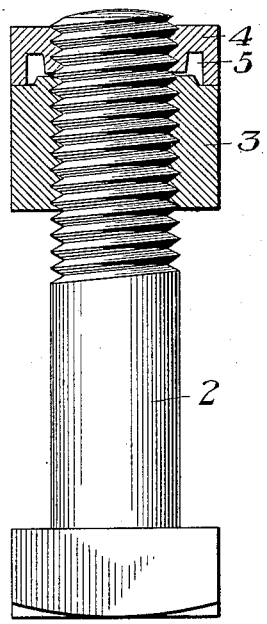
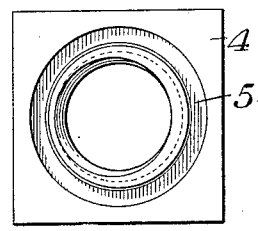
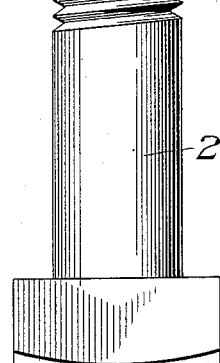
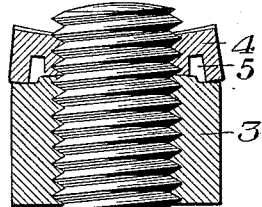
WITNESSES
INVENTOR
Ferdinand Mummelthey,

UNITED STATES PATENT OFFICE.

FERDINAND MUMMELTHEY, OF CORAOPOLIS, PENNSYLVANIA.

NUT-LOCK.

1,046,483.  Specification of Letters Patent.  Patented Dec. 10, 1912.

Application filed January 22, 1912. Serial No. 672,775.

*To all whom it may concern:*

Be it known that I, FERDINAND MUMMELTHEY, a resident of Coraopolis, in the county of Allegheny and State of Pennsylvania, have invented a new and useful Improvement in Nut-Locks, of which the following is a full, clear, and exact description, reference being had to the accompanying drawings, forming part of this specification, in which—

Figure 1 is a perspective view showing my improved nut lock applied to a bolt. Fig. 2 is a view of the same in side elevation with the nuts in section, and the locking nut slightly unscrewed with reference to the nut proper. Fig. 3 is a view similar to Fig. 2, but showing the nuts in their locked engagement, and Fig. 4 is a bottom plan view of the locking nut.

My invention has relation to nut locks and is designed to provide a simple and efficient form of nut lock, which can be readily applied to bolts and nuts of existing standard forms without change therein, and which can be readily manufactured and applied.

In the accompanying drawings, the numeral 2 designates a bolt of standard form and 3 the usual nut which may be either square, circular, hexagonal, or of other standard shape, and which may be either flat or crowned upon its outer surface.

4 designates a locking nut which is formed with an internal thread, corresponding to the thread of the bolt and of the nut 3, and which is adapted to be screwed upon the end of the bolt above the nut 3. The nut 4 is preferably made with initial flat upper and lower surfaces and is of sufficient thickness to give it body and enable a wrench to be effectively applied thereto. To give this nut sufficient elasticity or spring for the purposes of the invention, notwithstanding its thickness, I form in its inner face an annular groove 5 of considerable depth. This groove not only gives the nut sufficient flexibility to allow it to assume the locked form hereinafter described and shown in Figs. 1 and 3, but it does this without interfering with the threaded portion of the nut which is of full thickness.

In the use of my improved nut lock, or locking nut, the latter is screwed upon the projecting end of the bolt after the nut 3 has been screwed home and is, by means of a wrench, forced against the nut 3 until its thread forms a continuation of the thread in the nut 3. This causes the locking nut to bend or flex so that it becomes concave with respect to both its axes; and this concaving of the nut in all directions causes it to take a firm bite or grip upon the thread of the bolt and thereby form an effective lock. Even if the nut 3 should subsequently back somewhat away from the nut 4, the latter will still retain its grip upon the thread of the bolt and will not work loose and fall off. When, however, the nut 4 is removed by means of a wrench, it has sufficient elasticity to return to substantially its original form and may be used repeatedly.

It will be observed that the use of my improved nut lock requires no departure whatever from the standard forms of bolts and nuts; that the locking nut can be cheaply manufactured and readily applied, that it forms a secure and efficient lock; and that it is capable of repeated use.

The locking nut can in all cases be forced against the nut 3 sufficiently so that it will catch that thread of the bolt which emerges from the nut 3, so that the two nuts in their locked position have a continuous engagement with the thread of the bolt. In forcing the locking nut to this position, it will to some extent bite into the outer surface of the nut 3.

What I claim is:

1. As a new article of manufacture, a locking nut formed with a threaded bolt opening therethrough, and having an annular groove in one face thereof surrounding the bolt opening, said groove having inner and outer walls of different heights, the nut being flexible, and the edges of the nut having wrench seating faces; substantially as described.

2. As a new article of manufacture, a flexible locking nut formed with a threaded bolt opening therethrough and having an annular groove in one face thereof, a flexing flange on the outer side of the groove, and a stop flange on the inner side thereof; substantially as described.

3. As a new article of manufacture, a flexible locking nut formed with a threaded bolt opening therethrough and having an annular groove in one face thereof, and an annular flange on each side of the groove, one of said flanges being arranged to flex the nut when it engages the nut to be locked, the other flange forming a stop for the locking nut; substantially as described.

4. As a new article of manufacture, a flexible locking nut formed with a threaded bolt opening therethrough and having an annular groove in one face thereof, annular flanges on each side of the groove, the outer flange being arranged to engage the inner face of the nut to be locked to flex the locking nut before the inner flange engages said nut; substantially as described.

5. A locking nut capable of being bent or sprung, said nut having a central threaded opening therethrough, with an annular groove in its seating face surrounding said opening, the inner and outer walls of said groove being of different heights; substantially as described.

In testimony whereof, I have hereunto set my hand.

FERDINAND MUMMELTHEY.

Witnesses:
HARRY C. GRAHAM,
CHESTER H. HOLMES.

Copies of this patent may be obtained for five cents each, by addressing the "Commissioner of Patents, Washington, D. C."